(12) United States Patent
Futatsugi

(10) Patent No.: US 8,145,580 B2
(45) Date of Patent: Mar. 27, 2012

(54) DATA MANAGEMENT APPARATUS AND METHOD FOR MANAGING DATA ELEMENTS USING A PLURALITY OF METADATA ELEMENTS

(75) Inventor: Hajime Futatsugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 959 days.

(21) Appl. No.: 12/136,995

(22) Filed: Jun. 11, 2008

(65) Prior Publication Data

US 2008/0313107 A1    Dec. 18, 2008

(30) Foreign Application Priority Data

Jun. 12, 2007   (JP) ................. 2007-155725

(51) Int. Cl.
 *G06F 17/00* (2006.01)
 *G06F 17/20* (2006.01)
(52) U.S. Cl. ...................................................... 706/11
(58) Field of Classification Search ...................... 706/11
 See application file for complete search history.

(56) References Cited

U.S. PATENT DOCUMENTS 5,787,274 A * 7/1998 Agrawal et al. ................... 1/1

FOREIGN PATENT DOCUMENTS

JP         2000-250798 A      9/2000

OTHER PUBLICATIONS

Chang "Classification-Based Concepts, Decision trees & Model Evaluation", Lecture 5 slides, 2006, pp. 17.*

* cited by examiner

*Primary Examiner* — Jeffrey A Gaffin
*Assistant Examiner* — Li-Wu Chang
(74) *Attorney, Agent, or Firm* — Canon U.S.A., Inc. IP Division

(57) ABSTRACT

Data elements are classified into a plurality of folders in accordance with classification conditions on the basis of each of a plurality of metadata elements. Data elements in each of the folders are further classified into a plurality of folders on the basis of a metadata element different from the metadata element associated with the folder. This operation is repeated in accordance with the number of metadata elements to organize a folder system having a tree structure. When a classification result based on a given one of the metadata elements is present in only one folder in the organized folder system and is not present in other folders arranged in the same layer as that of the folder, the other folders are deleted.

8 Claims, 16 Drawing Sheets

FIG. 3A

| DATA TYPE | |
|---|---|
| DOCUMENT | ~301 |
| BINDER | ~302 |
| PICTURE | ~303 |
| MOVIE | ~304 |

| DOCUMENT | |
|---|---|
| METADATA NAME | DATA FORM |
| DATA TYPE | CHARACTER STRING |
| FILE NAME | CHARACTER STRING |
| FILE READ NAME | CHARACTER STRING |
| AUTHOR | CHARACTER STRING |
| CREATE DATE | DATE |
| SIZE | INTEGER |
| NUMBER OF PAGES | INTEGER |

302

| BINDER | |
|---|---|
| METADATA NAME | DATA FORM |
| DATA TYPE | CHARACTER STRING |
| FILE NAME | CHARACTER STRING |
| FILE READ NAME | CHARACTER STRING |
| AUTHOR | CHARACTER STRING |
| CREATE DATE | DATE |
| SIZE | INTEGER |
| NUMBER OF DOCUMENTS | INTEGER |

303

| PICTURE | |
|---|---|
| METADATA NAME | DATA FORM |
| DATA TYPE | CHARACTER STRING |
| FILE NAME | CHARACTER STRING |
| FILE READ NAME | CHARACTER STRING |
| AUTHOR | CHARACTER STRING |
| CREATE DATE | DATE |
| SIZE | INTEGER |
| RESOLUTION | INTEGER |
| FORMAT | CHARACTER STRING |

304

| MOVIE | |
|---|---|
| METADATA NAME | DATA FORM |
| DATA TYPE | CHARACTER STRING |
| FILE NAME | CHARACTER STRING |
| FILE READ NAME | CHARACTER STRING |
| AUTHOR | CHARACTER STRING |
| CREATE DATE | DATE |
| SIZE | INTEGER |
| RECORDING TIME | INTEGER |
| ENCODE | CHARACTER STRING |

FIG.3C

| DATA FORM |
|---|
| CHARACTER STRING |
| DATE |
| INTEGER |

FIG.3D

| TABLE NAME | |
|---|---|
| COMMON | |
| COLUMN NAME | DATA FORM |
| DATA_TYPE | VARCHAR2 |
| FILE_NAME | VARCHAR2 |
| FILE_READ_NAME | VARCHAR2 |
| AUTHOR | VARCHAR2 |
| CREATE_DATE | DATE |
| SIZE | NUMBER |

307

| TABLE NAME | | ~308 |
|---|---|---|
| DOCUMENT | | |
| COLUMN NAME | DATA FORM | |
| PAGE_NUM | NUMBER | |

| TABLE NAME | | ~309 |
|---|---|---|
| BINDER | | |
| COLUMN NAME | DATA FORM | |
| DOCUMENT_NUM | NUMBER | |

| TABLE NAME | | ~310 |
|---|---|---|
| PICTURE | | |
| COLUMN NAME | DATA FORM | |
| DEPTH | NUMBER | |
| FORMAT | VARCHAR2 | |

| TABLE NAME | | ~311 |
|---|---|---|
| MOVIE | | |
| COLUMN NAME | DATA FORM | |
| PLAY_TIME | NUMBER | |
| ENCODE | VARCHAR2 | |

FIG. 4

401 — CLASSIFICATION RULE 1

| | |
|---|---|
| CLASSIFICATION RULE ID | RULE00001 |
| DATA FORM | DATE |
| NUMBER OF CLASSIFICATIONS | 4 |
| MATCHING CONDITION 1 | PAST DAY |
| MATCHING CONDITION 2 | PAST WEEK |
| MATCHING CONDITION 3 | PAST MONTH |
| MATCHING CONDITION 4 | OTHER |

402 — CLASSIFICATION RULE 2

| | |
|---|---|
| CLASSIFICATION RULE ID | RULE00002 |
| DATA FORM | CHARACTER STRING |
| NUMBER OF CLASSIFICATIONS | 0 |

403 — CLASSIFICATION RULE 3

| | |
|---|---|
| CLASSIFICATION RULE ID | RULE00003 |
| DATA FORM | CHARACTER STRING |
| NUMBER OF CLASSIFICATIONS | 3 |
| MATCHING CONDITION 1 | FIRST LETTER IS ANY OF "A" TO "N" |
| MATCHING CONDITION 2 | FIRST LETTER IS ANY OF "O" TO "Z" |
| MATCHING CONDITION 3 | OTHER |

404 — CLASSIFICATION RULE 4

| | |
|---|---|
| CLASSIFICATION RULE ID | RULE00004 |
| DATA FORM | CHARACTER STRING |
| NUMBER OF CLASSIFICATIONS | 8 |
| MATCHING CONDITION 1 | FIRST LETTER IS ANY OF "A" TO "C" |
| MATCHING CONDITION 2 | FIRST LETTER IS ANY OF "D" TO "F" |
| MATCHING CONDITION 3 | FIRST LETTER IS ANY OF "G" TO "J" |
| MATCHING CONDITION 4 | FIRST LETTER IS ANY OF "K" TO "N" |
| MATCHING CONDITION 5 | FIRST LETTER IS ANY OF "O" TO "R" |
| MATCHING CONDITION 6 | FIRST LETTER IS ANY OF "S" TO "V" |
| MATCHING CONDITION 7 | FIRST LETTER IS ANY OF "W" TO "Z" |
| MATCHING CONDITION 8 | OTHER |

405 — CLASSIFICATION RULE 5

| | |
|---|---|
| CLASSIFICATION RULE ID | RULE00005 |
| DATA FORM | INTEGER |
| NUMBER OF CLASSIFICATIONS | 3 |
| MATCHING CONDITION 1 | 0124 OR LESS |
| MATCHING CONDITION 2 | 0125 - 32768 |
| MATCHING CONDITION 3 | 32769 OR MORE |

FIG. 5

501 — CLASSIFICATION SET 1

| CLASSIFICATION SET 1 | |
|---|---|
| CLASSIFICATION SET ID | SET00001 |
| NUMBER OF CLASSIFICATION RULES | 3 |
| FIRST METADATA | SIZE |
| FIRST CLASSIFICATION RULE | RULE00005 |
| SECOND METADATA | CREATE DATE |
| SECOND CLASSIFICATION RULE | RULE00001 |
| THIRD METADATA | DATA TYPE |
| THIRD CLASSIFICATION RULE | RULE00002 |

502 — CLASSIFICATION SET 2

| CLASSIFICATION SET 2 | |
|---|---|
| CLASSIFICATION SET ID | SET00002 |
| NUMBER OF CLASSIFICATION RULES | 2 |
| FIRST METADATA | FILE READ NAME |
| FIRST CLASSIFICATION RULE | RULE00003 |
| SECOND METADATA | FILE READ NAME |
| SECOND CLASSIFICATION RULE | RULE00004 |

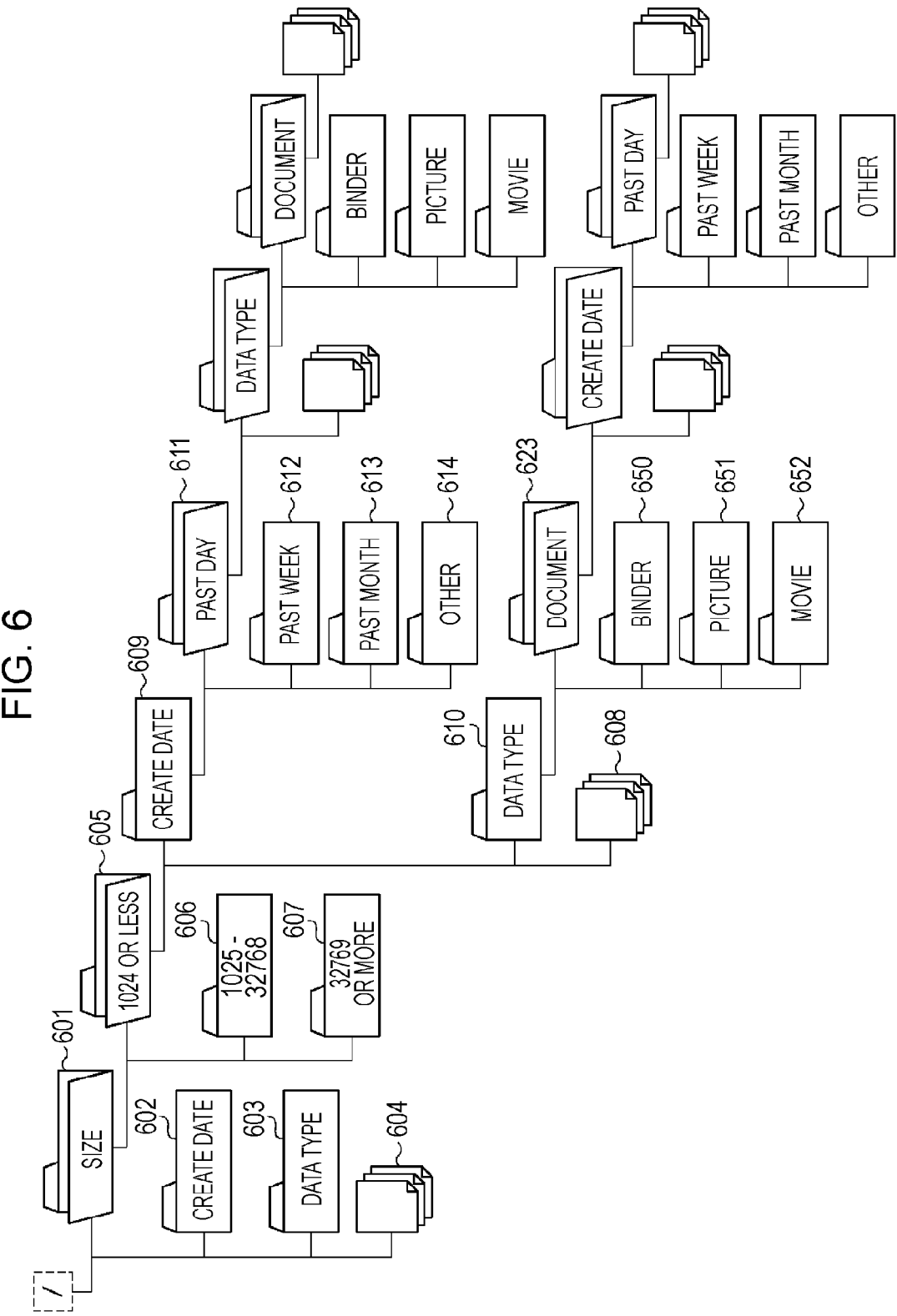

FIG. 11A
```
SELECT
    *
FROM
    COMMON
WHERE
    SIZE ≤ 1024;
```

FIG. 11B
```
SELECT
    *
FROM
    COMMON
WHERE
    SIZE BETWEEN 1025 AND 32768;
```

FIG. 11C
```
SELECT
    *
FROM
    COMMON
WHERE
    SIZE ≥ 32769;
```

FIG. 12
```
SELECT
    *
FROM
    COMMON cm1
WHERE
    cm1.CREATE_DATE ≥ TO_CHAR(sysdate-7, 'YYYYMMDD') AND
    cm1.FILE_NAME IN
        (SELECT
            cm2.FILE_NAME
        FROM
            COMMON cm2
        WHERE
            cm2.SIZE ≥ 1024);
```

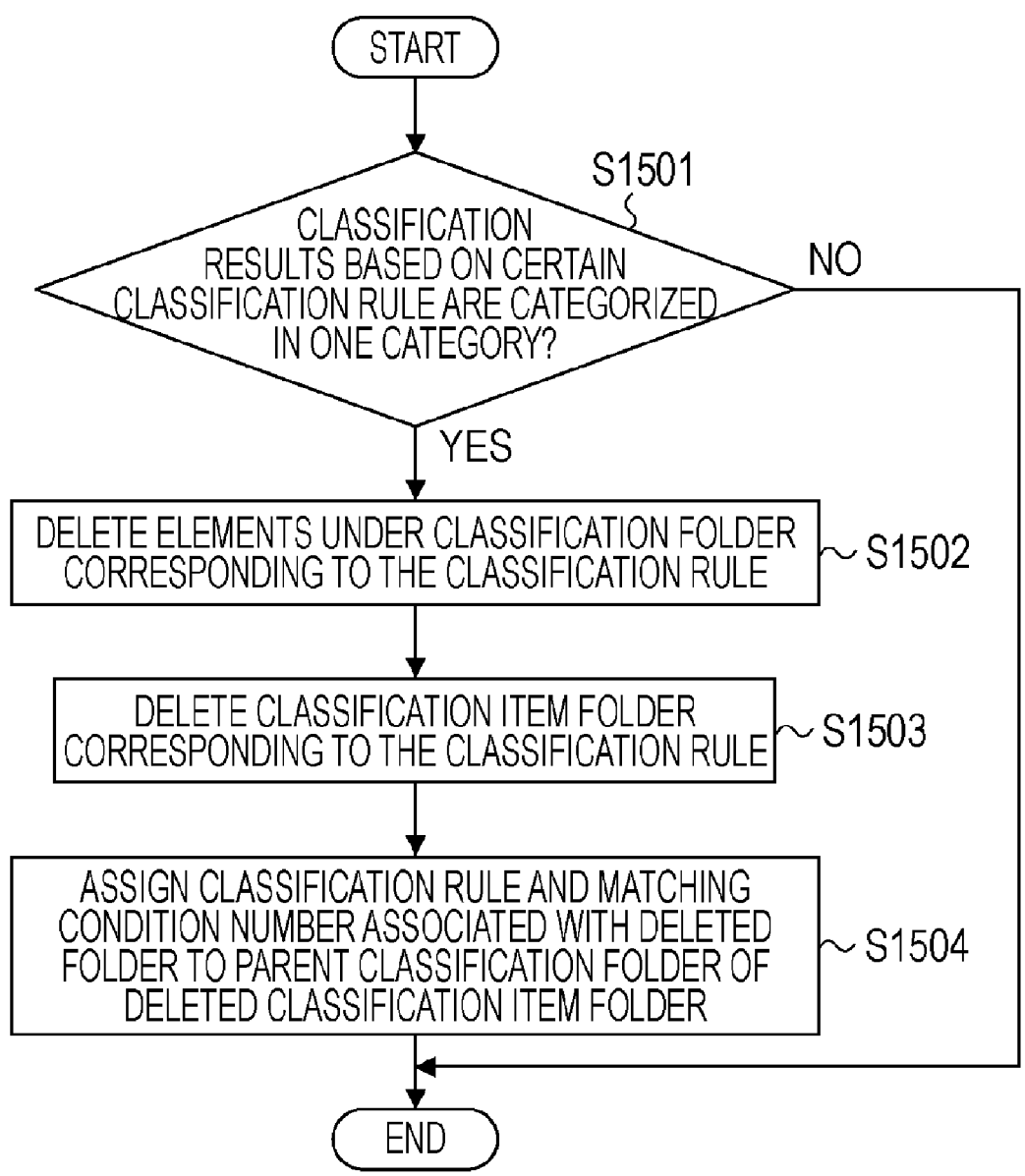

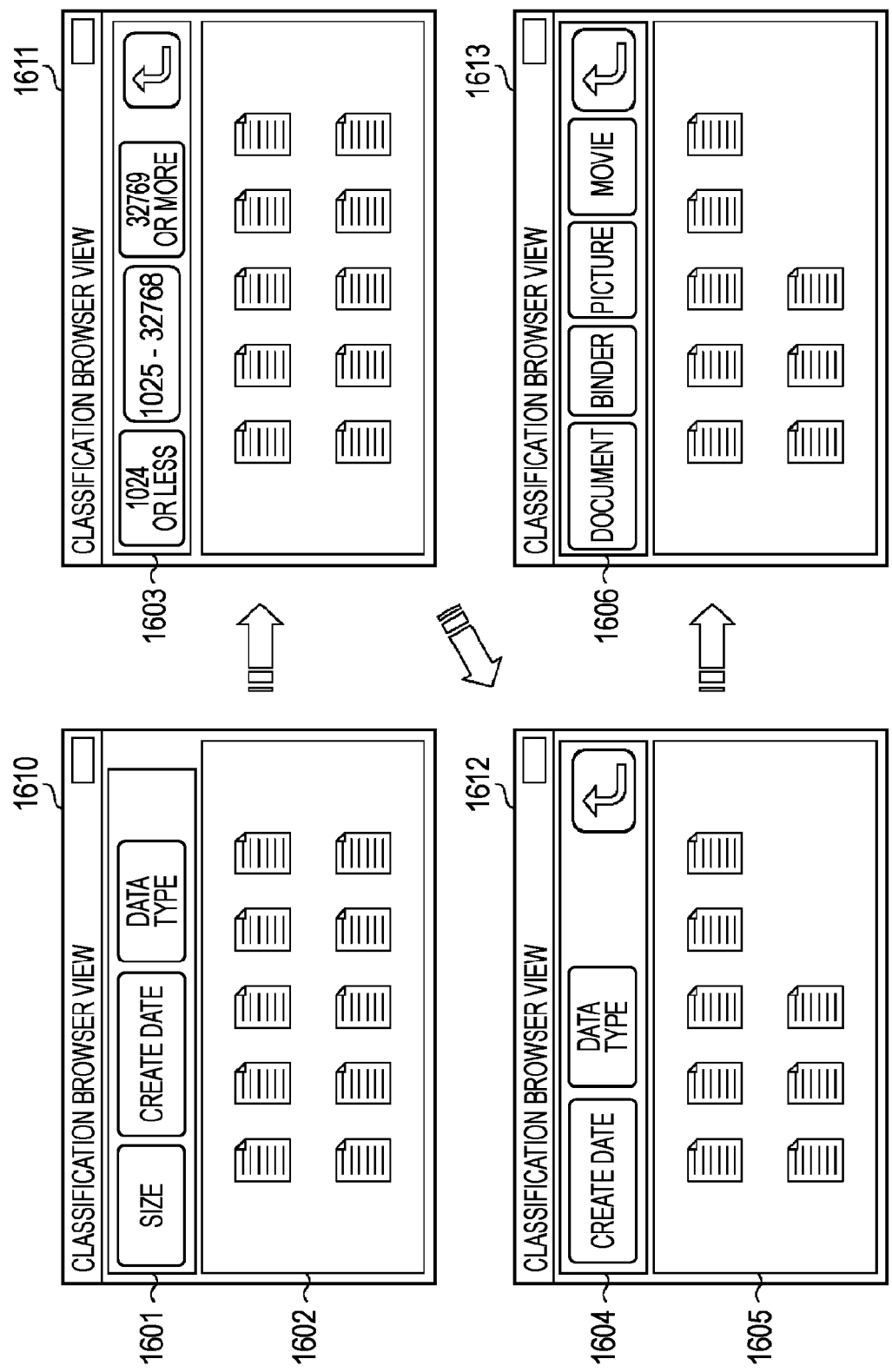

DATA MANAGEMENT APPARATUS AND METHOD FOR MANAGING DATA ELEMENTS USING A PLURALITY OF METADATA ELEMENTS

BACKGROUND OF THE INVENTION

1. Field of the Invention

The present invention relates to a technique for dynamically classifying data using metadata attached to the data.

2. Description of the Related Art

Techniques in which data is automatically classified on the basis of metadata attached to the data have been proposed. For example, Japanese Patent Laid-Open No. 2000-250798 discloses a method in which a folder is generated for each value of a metadata item that is selected by a user and in which data elements having the corresponding value of metadata are stored in the folder to perform classification based on the values of metadata. The disclosed method allows layered classification according to preferences of a user by specifying the order of use of metadata items during the classification, and provides various folder systems, which are not feasible with existing folder management techniques.

In the related art, however, since a number of folders corresponding to the number of values of metadata are generated, a large number of folders are generated in order to classify a large number of data elements. It is therefore difficult to apply this method to compact devices with limited screen sizes. Further, unlike the storage of data in static folders, a search based on a metadata item is performed every time a folder containing classification results is opened. In order to improve performance, for example, data elements classified in an unopened folder are read ahead and cached in a memory. However, compact devices with limited memory capacities do not have sufficient cache space, and have a problem with performance.

SUMMARY OF THE INVENTION

The present invention provides a technique for efficiently performing automatic classification of data based on metadata even by using a compact device with a limited resource.

In an aspect of the present invention, a data management apparatus for managing data elements in association with a plurality of metadata elements includes the following elements. An organization unit is configured to organize a folder system having a tree structure by repeating a classification operation in accordance with the number of metadata elements, the classification operation including classifying the data elements into a plurality of folders in accordance with classification conditions on the basis of each of the plurality of metadata elements, and further classifying data elements in each of the folders into a plurality of folders on the basis of a metadata element different from the metadata element associated with the folder. A reorganization unit is configured to reorganize the organized folder system having a tree structure by deleting, when a classification result based on a given one of the metadata elements is present in a given one of the folders in the organized folder system and is not present in other folders having the same parent folder as the given folder and arranged in the same layer as that of the given folder, the parent folder and sub-folders associated with the given metadata element.

According to the present invention, the number of folders generated for automatic classification of data based on metadata can be reduced, and even a compact device with a limited resource can also be used to efficiently classify a large number of data elements. Thus, a user can quickly search for a desired data element even if a large number of data elements are stored.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A to 3D are diagrams showing definitions of metadata elements used in the data management system according to the embodiment and table definitions in a database.

FIG. 4 is a diagram showing classification rules used in the data management system according to the embodiment.

FIG. 5 is a diagram showing classification sets used in the data management system according to the embodiment.

FIG. 6 is a diagram showing an example of classification results obtained using the classification sets according to the embodiment.

FIGS. 11A to 11C and 12 are diagrams showing examples of structured query language (SQL) queries including matching conditions of classification rules according to the embodiment.

FIG. 15 is a flowchart showing an example of the classification tree reorganization process according to the embodiment.

FIG. 16 is a diagram showing an example of a classification browser view of a data management system according to an embodiment of the present invention.

DESCRIPTION OF THE EMBODIMENTS

Preferred embodiments of the present invention will be described in detail hereinafter with reference to the drawings. The present invention is not limited to the following embodiments, and specific exemplary embodiments that are advantageous in carrying out the present invention are merely illustrated and are not intended to limit the scope of the invention. Further, all combinations of features described in the following embodiments are not necessarily essential to the present invention.

First Embodiment

Figure 1:
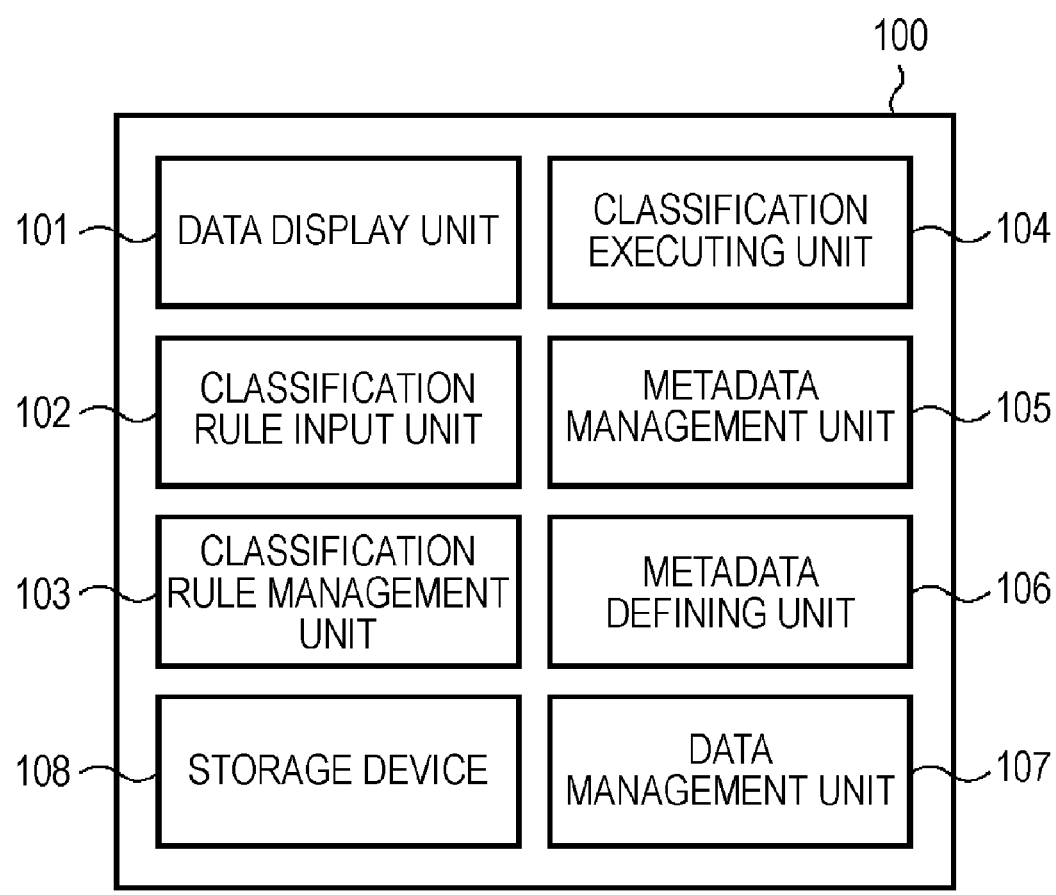
FIG. 1 is a module block diagram of a data management system according to an embodiment of the present invention.

FIG. 1 is a module block diagram of a data management apparatus 100 according to a first embodiment of the present invention.

The data management apparatus 100 includes a data display unit 101, a classification rule input unit 102, a classification rule management unit 103, a classification executing unit 104, a metadata management unit 105, a metadata defining unit 106, a data management unit 107, and a storage device 108. The data display unit 101 serves as a display unit and is configured to display a folder tree, data, etc. The classification rule input unit 102 is used to enter a classification rule and a classification set, which will be described below. The classification rule management unit 103 is configured to store and obtain a classification rule and a classification set. The classification executing unit 104 serves as an organization unit and a reorganization unit, and is configured to classify data elements on the basis of a classification set to generate folder layers. The metadata management unit 105 serves as an obtaining unit, and is configured to store and obtain metadata elements. The metadata defining unit 106 is configured to manage definitions of metadata elements that are used by the data management apparatus 100. The storage device 108 serves as a classification rule storage unit and a classification set storage unit, and is configured to store various data including data, metadata, and classification rules. The data management apparatus 100 may further include modules configured to input and output data. However, components that do not directly relate to the present invention are not discussed herein.

Figure 2:
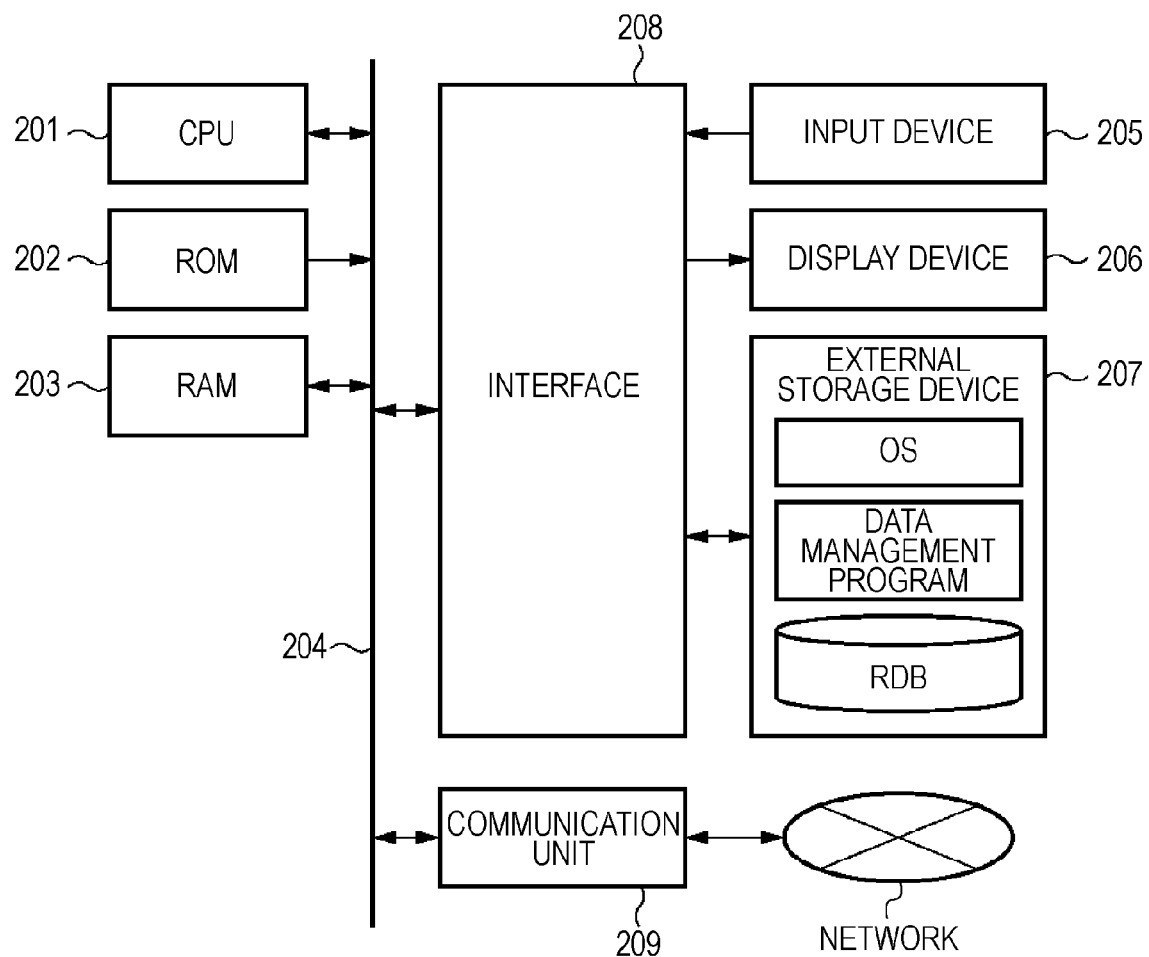
FIG. 2 is a block diagram of a computer apparatus implementing the data management system shown in FIG. 1.

FIG. 2 is a block diagram showing a structure of a computer apparatus implementing the data management apparatus 100 shown in FIG. 1.

A central processing unit (CPU) 201 executes an operating system (OS) and various application programs, and controls the operation of the components of the computer apparatus. A read-only memory (ROM) 202 stores fixed data among the programs executed by the CPU 201 and calculation parameters. A random access memory (RAM) 203 provides a work area of the CPU 201 or a temporary data storage area. The ROM 202 and the RAM 203 are connected to the CPU 201 via a bus 204. An input device 205 such as a keyboard, a display device 206 such as a cathode-ray tube (CRT) display or a liquid crystal display, and an external storage device 207 such as a hard disk drive, a magneto-optical (MO) disk, or a compact disk read-only memory (CD-ROM) are connected to the bus 204 via an interface 208. The bus 204 is connected to a network via a communication unit 209.

The input device 205 corresponds to the classification rule input unit 102, and the display device 206 corresponds to the data display unit 101. The storage device 108 is constituted by the ROM 202, the RAM 203, and the external storage device 207. The external storage device 207 stores an OS and a data management program for causing the CPU 201 to function as the classification rule management unit 103, the classification executing unit 104, the metadata management unit 105, and the data management unit 107.

FIGS. 3A to 3D are diagrams showing examples of data types and metadata definitions, which are used by the data management apparatus 100 of the first embodiment.

As shown in FIG. 3A, four data types are registered, namely, a document 301, a binder 302, a picture 303, and a movie 304. Each of the data types is defined with metadata elements shown in FIG. 3B. In the first embodiment, each of the metadata elements is defined with a metadata name and a data form. FIG. 3C shows data forms of the metadata elements according to the first embodiment.

The data management apparatus 100 of the first embodiment constructs a relational database (RDB) in the storage device 108, and metadata definitions are defined in units of the data types by tables in the RDB. FIG. 3D shows examples of table definitions of the RDB. A COMMON table 307 is a table defining metadata elements common to the data types. A DOCUMENT table 308, a BINDER table 309, a PICTURE table 310, and a MOVIE table 311 are table defining metadata elements associated with the respective data types.

FIG. 4 is a diagram showing classification rules 1 to 5, which are used by the data management apparatus 100 of the first embodiment.

In the first embodiment, a classification rule defines a data form of a metadata element used for classification, and a classification method. The classification method defines the number of classifications indicating the number of categories to classify, and a classification condition of each of the categories. The classification condition is defined by a matching condition, which is a value of the metadata element. Each classification rule is assigned a unique identifier (classification rule ID). For example, the classification rule 1 (401) defines "date" as the data form of the metadata element, and also defines a rule of classifying into four categories according to matching conditions (matching condition 1 "past day", matching condition 2 "past week", matching condition 3 "past month", and matching condition 4 "other"). The classification rule 2 (402) defines "character string" as the data form of the metadata element, and also defines the number of classifications "0". In a case where the number of classifications is set to 0, data elements are classified every value of metadata element without using matching conditions. A plurality of classification rules may be registered for the data form of the same metadata element. The classification rule 3 (403) and the classification rule 4 (404) are classification rules of a "character string" form, and define classification methods of classifying into three categories and 11 categories, respectively, using matching conditions based on the first letter in the character string. The classification rule 5 (405) defines classification rules of a metadata element in an integer form.

A plurality of such classification rules are stored in the storage device 108 serving as a classification rule storage unit.

FIG. 5 is a diagram showing examples of classification sets, which are used by the data management apparatus 100 of the first embodiment.

Figure 7:
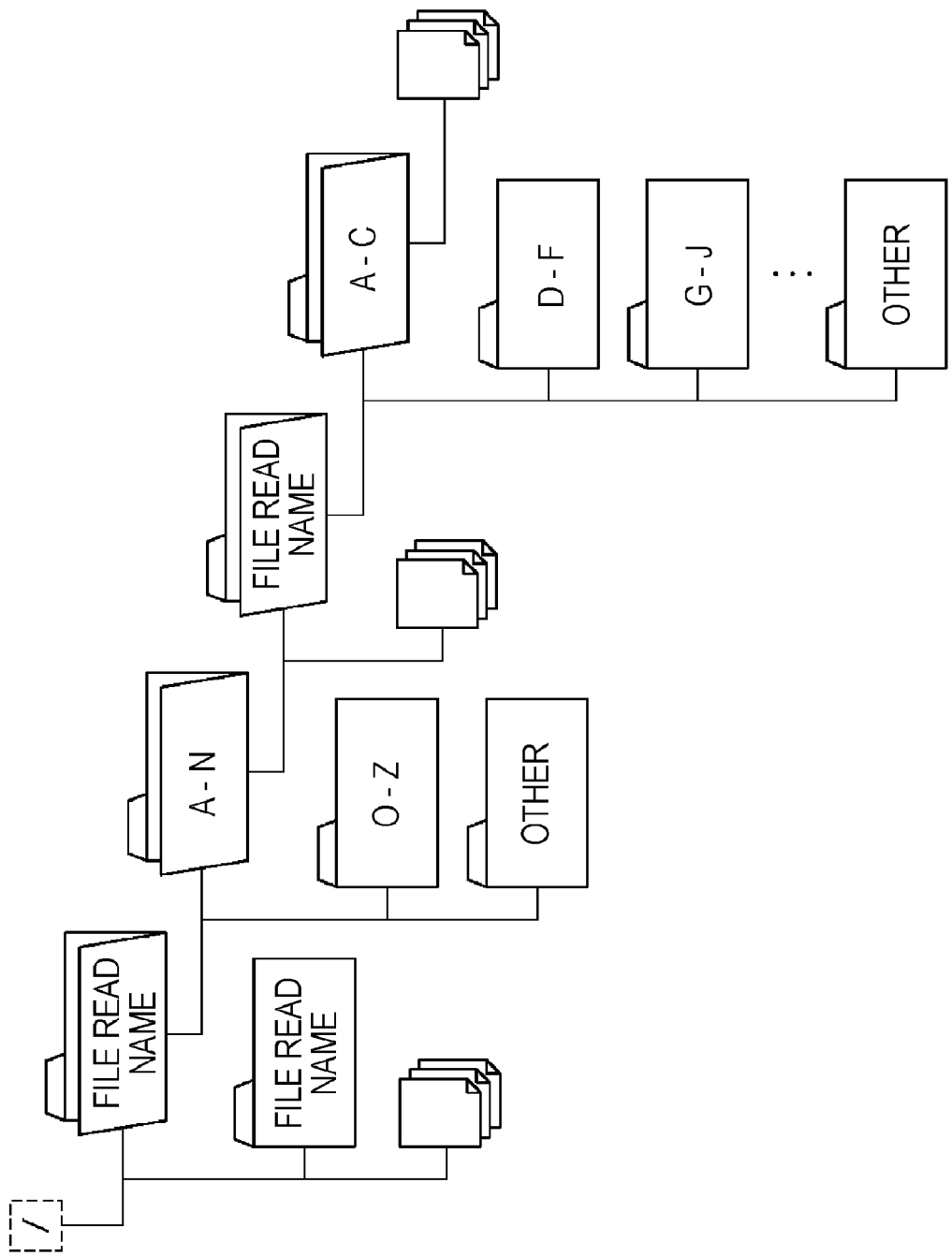
FIG. 7 is a diagram showing an example of classification results obtained using the classification sets according to the embodiment.

A classification set defines a plurality of sets each having the name of a metadata element used for classification and identification information for identifying a classification rule used for the metadata element. In the first embodiment, a classification method of data is determined by a classification set. The classification set is stored in the storage device 108 serving as a classification set storage unit. The classification set may have registered therein a desired number of metadata elements to be used for classification. Each classification set is assigned a unique identifier (classification set ID). For example, classification set 1 (501) includes three metadata elements "size", "create date", and "data type" as metadata elements to be used for classification. Those metadata elements define the use of the classification rule 5 (405 in FIG. 4), the classification rule 1 (401 in FIG. 4), and the classification rule 2 (402 in FIG. 4), respectively, to perform classification. Each classification set may also have an identical metadata element redundantly registered therein. Classification set 2 (502) includes "file read name" as a metadata element to be used for classification, and defines the use of the classification rule 3 (403 in FIG. 4) and the classification rule 4 (404 in FIG. 4) to perform classification. FIGS. 6 and 7 show examples of classification results based on the classification sets 1 and 2. The details of actual classification processing based on a classification set are described below.

Figure 8:
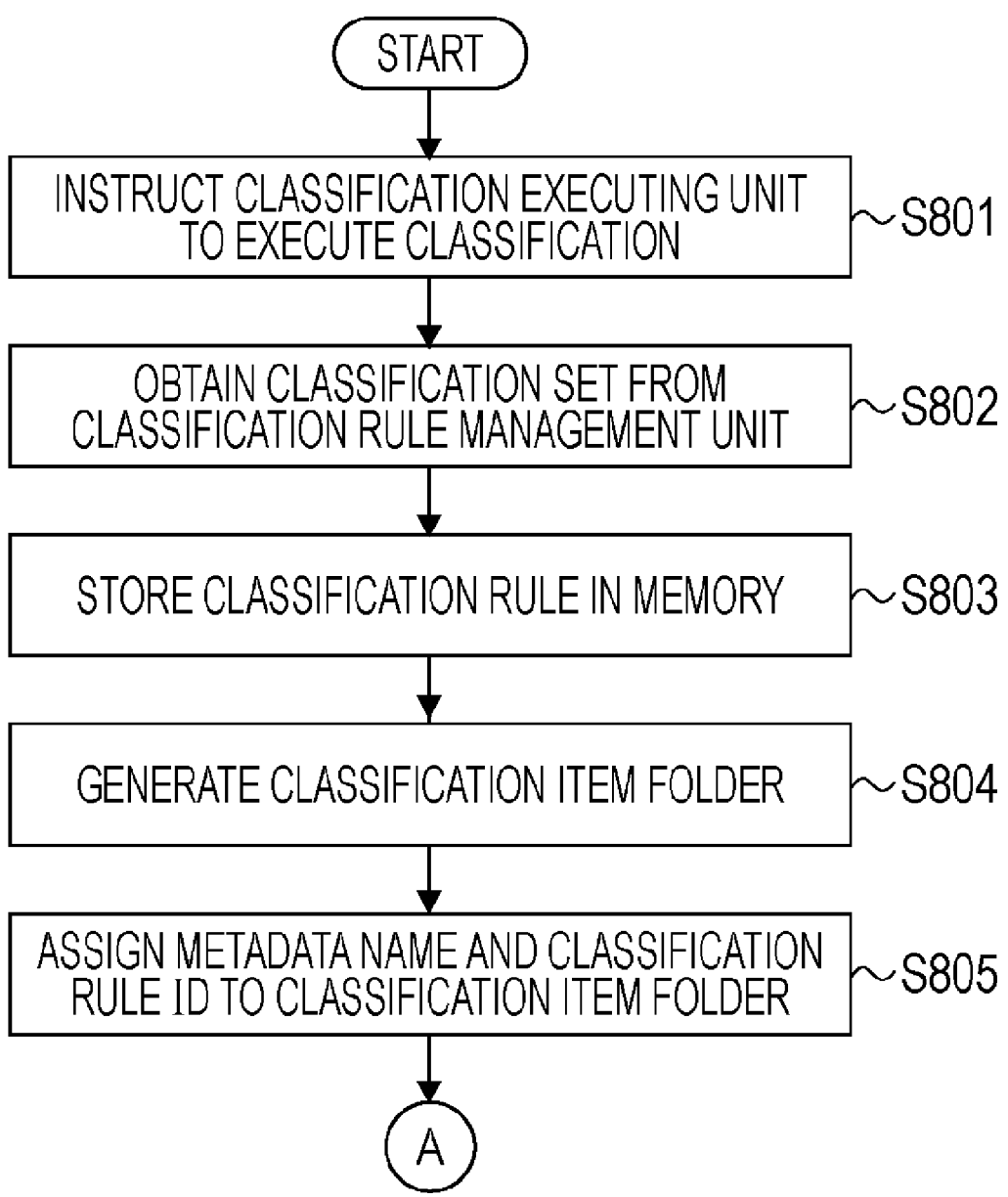
FIG. 8 is a flowchart showing a classification process according to the embodiment.

A classification processing procedure according to the first embodiment will now be described with reference to flowcharts shown in FIGS. 8, 9, and 10. A program corresponding to the flowcharts is included in the data management program stored in the external storage device 207. In response to an event such as power-on, the program is loaded into the RAM 203 and is executed by the CPU 201. In this procedure, a user specifies the classification set 1 (501 in FIG. 5), by way of example.

First, when the user selects a classification set using the input device 205 (in this example, the user selects the classification set 1), the classification executing unit 104 is instructed to specify the classification set ID (SET0001) and start executing a classification operation (step S801). The classification executing unit 104 inquires the classification rule management unit 103 about the specified classification set ID, and obtains the classification set 1 (step S802). The classification executing unit 104 then inquires the classification rule management unit 103 about the classification rule IDs (RULE0005, RULE0001, and RULE0002), which are registered in the obtained classification set 1, and obtains the classification rules 5, 1, and 2. The obtained classification rules 5, 1, and 2 are stored in the memory (RAM 203) (step S803).

Then, the classification executing unit 10 classifies data elements on the basis of each of the plurality of metadata elements to construct a folder system having a tree structure. In the creation of a tree, first, a classification item folder corresponding to a metadata element registered in a classification set and a list of all content items registered in the data management apparatus 100 (e.g., content items 604 shown in FIG. 6) are generated as elements in the first layer of the tree (step S804). In this example, classification item folders 601 to 603 corresponding to the metadata elements registered in the classification set 1, namely, "size", "create date", and "data type", are created. Each of the created classification item folders is assigned a corresponding metadata name and classification rule ID (step S805). The displayed name of the classification item folder is determined by a high-order application using the above-described pieces of information. In the example shown in FIG. 6, the names of the metadata elements are directly used as folder names.

Figure 9:
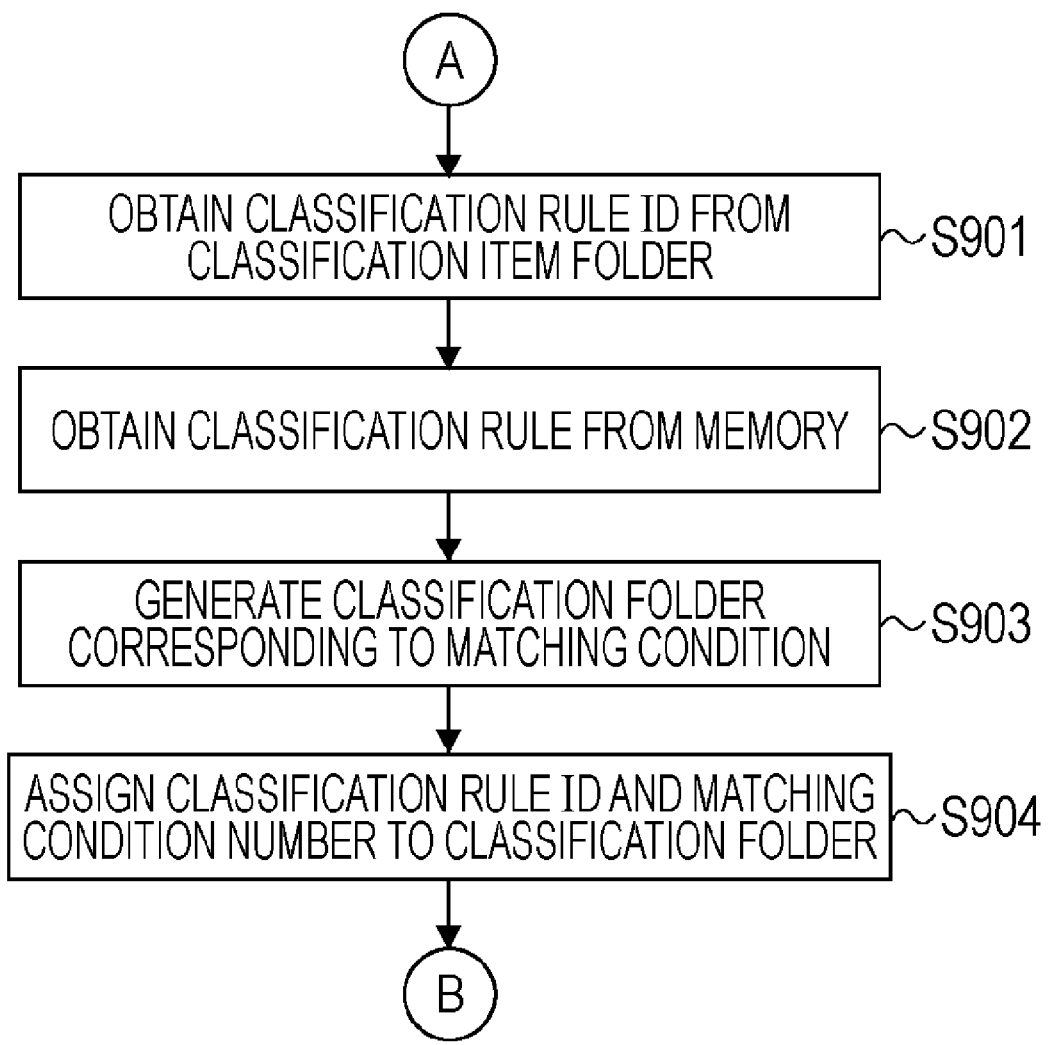
FIG. 9 is a flowchart showing a continued part of the classification process shown in FIG. 8.

Then, the procedure proceeds to a procedure of creating a classification folder as a sub-folder of a classification item folder (see FIG. 9). The classification folder corresponds to a matching condition designated in a classification rule associated with the classification item folder. In this example, the classification item folder 601 named "size" (hereinafter referred to as the "size" classification item folder 601) is used.

First, the classification executing unit 104 obtains the classification rule ID (RULE0005) assigned to the generated "size" classification item folder 601 (step S901), and then obtains the classification rule 5 corresponding to the classification rule ID from the memory (RAM 203) (step S902). Then, the classification executing unit 104 generates classification folders 605 to 607 corresponding to the matching conditions 1 to 3 (see 405 shown in FIG. 4) defined in the classification rule 5 (step S903).

Then, the classification executing unit 104 assigns, to the classification folders 605 to 607, the classification rule ID (RULE0005) corresponding to the parent classification item folder 601 and the matching condition numbers 1 to 3 corresponding to the classification folders 605 to 607 (step S904). The displayed names of the classification folders 605 to 607 are determined by the high-order application using the above-described pieces of information. In the example shown in FIG. 6, matching conditions are directly displayed as folder names.

Figure 10:
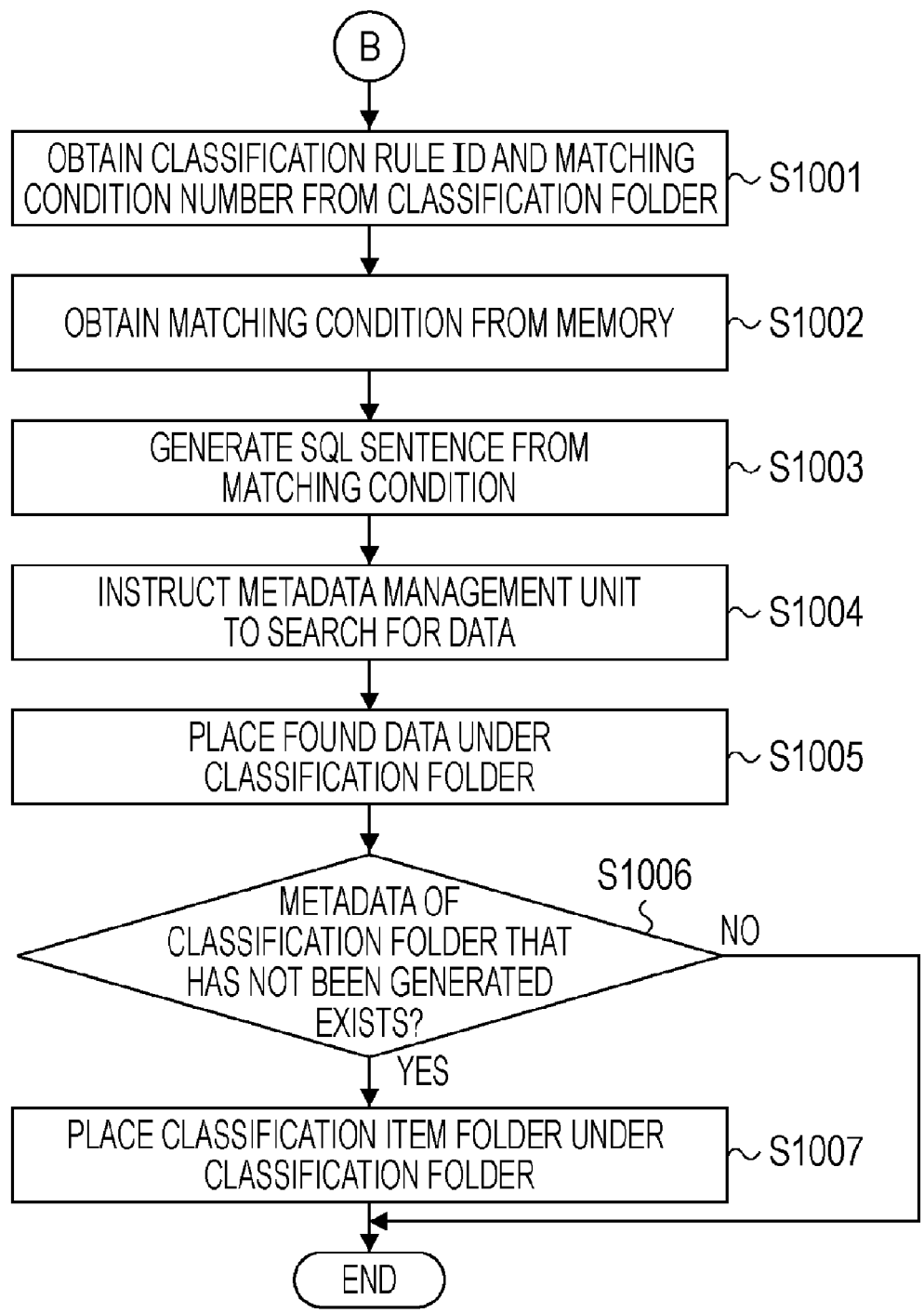
FIG. 10 is a flowchart showing a continued part of the classification process shown in FIG. 9.

The process proceeds to the flow shown in FIG. 10, and data elements to be classified into the generated classification folders 605 to 607 are selected. In the first embodiment, since an RDB is used, classification is performed using a database search based on structured query language (SQL). In the following description, the classification folders 605 to 607, which are sub-folders of the "size" classification item folder 601, are used by way of example.

First, the classification executing unit 104 obtains the classification rule ID (RULE0005) and the matching condition numbers (matching conditions 1 to 3), which are assigned to the generated classification folders 605 to 607 (step S1001). Then, the classification executing unit 104 obtains the classification rule 5 from the memory (RAM 203) to obtain the registered matching conditions ("1024 or less", "1025-32768", and "32769 or more") (step S1002). Then, the classification executing unit 104 generates SQL queries from the obtained matching conditions (step S1003). The metadata element "size" corresponds to column SIZE in the COMMON table 307 on the RDB (see FIG. 3D), and SQL queries for selecting data elements to be classified into the classification folders 605 to 607 are shown in FIGS. 11A to 11C, respectively. After the SQL queries are generated, the classification executing unit 104 passes the SQL queries to the metadata management unit 105 to perform a database search (step S1004).

The metadata management unit 105 performs a search according to the specified SQL queries, and returns metadata elements of data elements found in the search to the classification executing unit 104. Finally, the classification executing unit 104 places data elements 608 found in the search under each classification folder on the basis of the metadata elements obtained from the metadata management unit 105 (step S1005).

The data elements are classified in this way. Then, if the metadata of classification folder that has not been generated exists (step S1006), the classification executing unit 104 places the remaining classification item folders as sub-folders of the classification folder (step S1007). The remaining classification item folders are folders present in the first layer of the tree generated according to the selected classification set, which do not include an upper-layer classification item folder of the classification folder of interest. For example, it is assumed that the classification folder 605 is the classification folder of interest. Since the upper-layer classification item folder of the classification folder 605 is the "size" classification item folder 601, the remaining classification item folders, namely, a "create date" classification item folder 609 and a "data type" classification item folder 610, are placed as sub-folders. In this manner, data elements and classification item folders are placed under a classification folder.

Afterwards, according to a procedure similar to that described above, a classification folder is placed under one of the classification item folders, and classified data elements and the remaining classification item folders are placed under the classification folder. This operation is repeated until no metadata elements remain for which a classification item folder has not been generated, thereby constructing a classification tree. In the first embodiment, a data element classified in a classification folder satisfies a matching condition associated with the classification folder among a set of data elements classified in classification folders that are present in an upper layer of the classification folder of interest. In other words, by tracing down the layers of the folder tree, the logical AND of the classification rules registered in classification sets is applied. According to this rule, SQL queries used to select data elements to be classified into classification folders in layers lower than the second layer are generated by performing a search based on the AND condition of the SQL queries and SQL queries used for the upper-layer classification folders.

This process is summarized as follows. First, data elements are classified into a plurality of folders (e.g., the folders 605 to 607) according to classification conditions on the basis of each of a plurality of metadata elements (e.g., "size" among "size", "create date", and "data type"). Then, for a given one of the folders, data elements in the given folder are further classified into a plurality of folders (folders 611 to 614) on the basis of another metadata element (e.g., "create date"), which is different from the metadata element associated with the given folder. This operation is repeated in accordance with the number of metadata elements to construct a folder system having a tree structure.

FIG. 12 shows an example of an SQL query used in association with the classification folder 611. The classification folder 611 is a folder corresponding to the matching condition 1 ("past day") in the classification rule 1 (401 in FIG. 4), which is used for the second metadata element "create date" of the classification set 1 (501 in FIG. 5). This corresponds to column CREATE_DATE in the COMMON table 307 (see FIG. 3D) on the RBD, and is also a sub-folder of the classification folder 605. Thus, an SQL query for selecting data elements that satisfy the classification rule applied to the classification folder 611 from the set of data elements classified in the classification folder 605 is generated. In the example shown in FIG. 12, the SQL query for the classification folder 611 is generated using an SQL query for the classification folder 605 as a sub-query.

Then, the classification item folders and the classification folders are reorganized on the basis of the classification results of the data elements. FIG. 15 is a flowchart showing a reorganization process.

In the first embodiment, a reorganization operation is performed on the basis of a rule that "no classification item folder or classification folder is generated in a case where only data elements that meet a single matching condition exist". The reorganization operation will be described in the context of the "create date" classification item folder 609, which is a sub-folder of the "size" classification item folder 601, by way of example. It is assumed here that conditions (1) and (2) below are satisfied, by way of example:
(1) A data element that meets the matching condition 1 ("past day") in the matching conditions of the classification rule 1 used for classification based on "creation date" exists.
(2) There are no data elements that meet the remaining matching conditions, namely, the matching conditions 2, 3, and 4 ("past week", "past month", and "other") (that is, the other folders present on the same layer as that of the "past day" folder 611, for example, folders 612 to 614). In this case, therefore, no data elements are stored in such sub-folders.

In step S1501, it is determined whether or not the conditions (1) and (2) described above are satisfied. If the conditions (1) and (2) are satisfied, the processing of steps S1502 to S1504 is executed.

Figure 13:
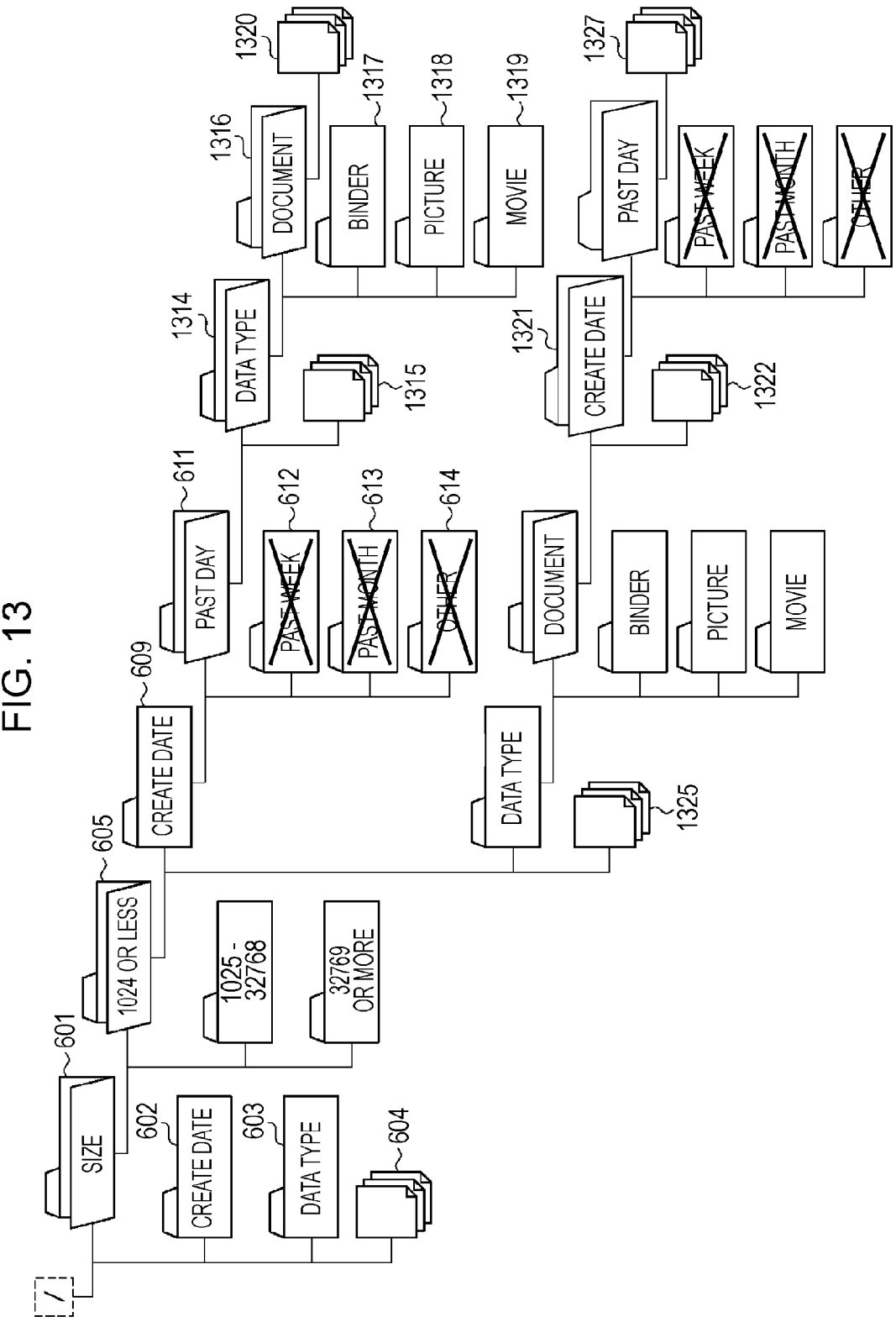
FIG. 13 is a diagram showing a classification tree reorganization process according to the embodiment.

FIG. 13 is a diagram showing an example of classification results in a case where the conditions (1) and (2) are satisfied. In the case of satisfying those conditions, data lists 1315 and 1325 shown in FIG. 13 include only data elements each having a size of 1024 or less and a create date within the past day. It is therefore ineffective that both classification results are redundantly stored. Data lists 1320, 1322, and 1327 also include only data elements each having a size of 1024 or less and a create date within the past day and each classified in the data type "document". It is therefore ineffective that the results are redundantly stored.

In the first embodiment, the folders are reorganized so that such redundant data elements are deleted. First, the classification folders 611 to 614, which reside in a sub-layer of the layer of the "create date" classification item folder 609, and elements 1314 to 1320, which reside in a layer lower than the sub-layer, are deleted (step S1502). Then, the "create date" classification item folder 609 is deleted (step S1503). Finally, the classification rule ID (RULE0001) associated with the "create date" and the matching condition number (i.e., 1) associated with the classification folder 611 in which the classified data elements are present are additionally assigned to the folder 605, which is the parent folder of the "create date" classification item folder 609 (step S1504). The elements in the classification item folder 1321 and its sub-folders are also deleted in a manner similar to that described above.

Figure 14:
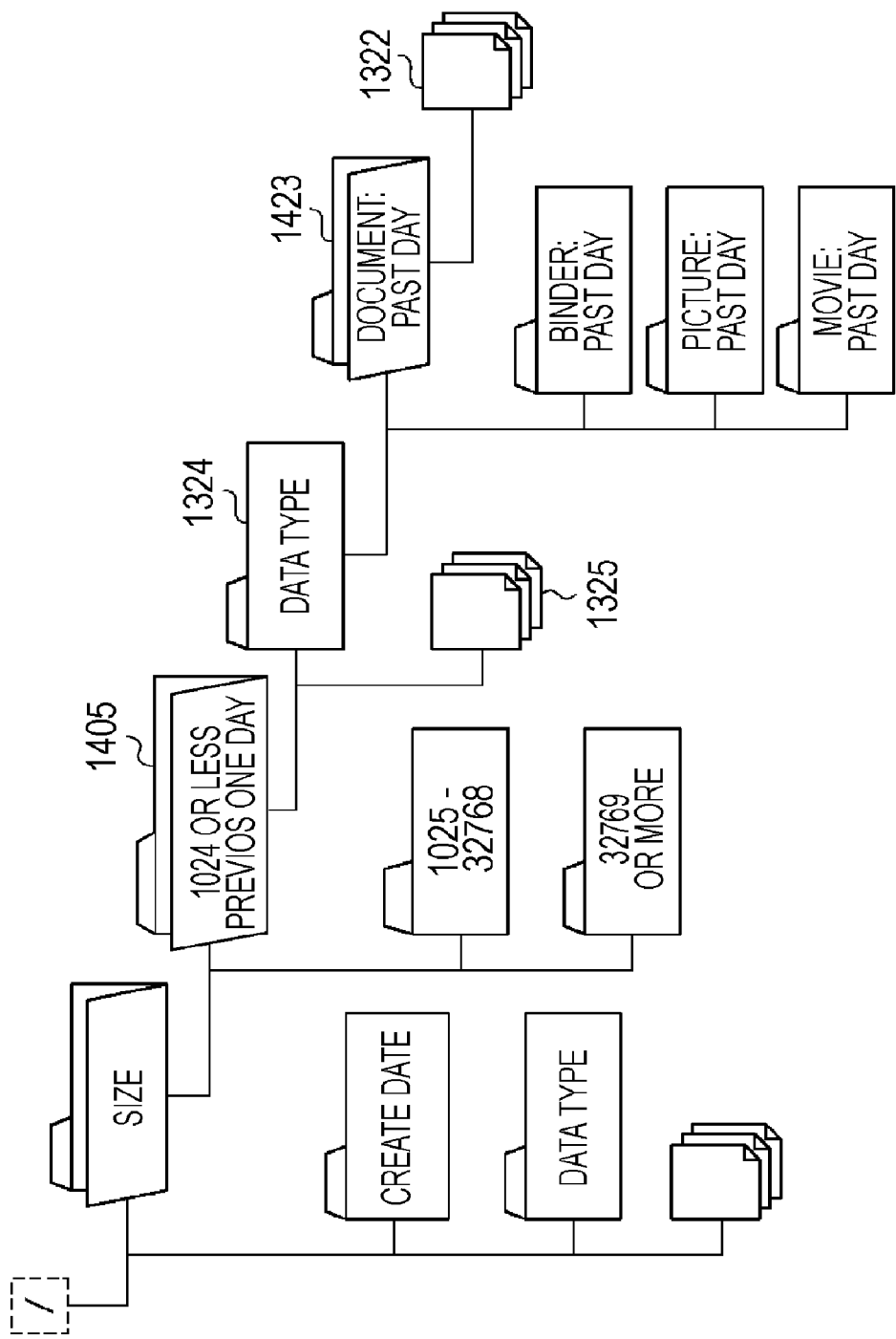
FIG. 14 is a diagram showing an example of a classification tree that is generated by the reorganization process according to the embodiment.

FIG. 14 shows a structure of a folder tree generated as a result of the reorganization. A classification folder 1405 is assigned the matching condition 1 of the classification rule 5 and the matching condition 1 of the classification rule 1. Likewise, a classification folder 1423 is assigned the matching condition 1 of the classification rule 2 and the matching condition 1 of the classification rule 1 (the classification rule 2 has a definition and has no matching conditions).

Accordingly, the classification process is performed.

Second Embodiment

A structure and operation of a second embodiment of the present invention are basically similar to those of the first embodiment, except for an arrangement on a display screen. FIG. 16 shows an example of the display screen according to the second embodiment. Operation buttons are arranged in an upper portion of the screen, and a list of data elements is displayed in a lower portion of the screen. In folder display portions 1601, 1603, 1604, and 1606, operation buttons corresponding to folders are displayed. In a classification browser view 1610, the operation buttons arranged in the folder display portion 1601 correspond to the classification item folders 601 to 603 shown in FIG. 6. A data list display portion 1602 corresponds to the list of data elements 604. In a classification browser view 1611, the operation buttons arranged in the folder display portion 1603 correspond to the classification folders 605 to 607. In a classification browser view 1612, the operation buttons arranged in the folder display portion 1604 correspond to the classification item folders 609 and 610, and a data list display portion 1605 corresponds to the list of data elements 608. In a classification browser view 1613, the operation buttons arranged in the folder display portion 1606 correspond to the classification folders 623 and 650 to 652.

For example, when a user presses (selects) the "size" button in the folder display portion 1601 in the classification browser view 1610, the classification item folder 601 is opened, and the classification folders 605 to 607 are obtained. A screen including the obtained classification folders represented by buttons is the classification browser view 1611. The user subsequently presses an operation button in a similar manner, thereby tracing the classification tree while opening classification folders and classification item folders. The second embodiment using the screen structure described above also falls within the scope of the present invention.

Third Embodiment

In the foregoing embodiments, classification folders are always generated except for the case where data elements are classified into a single category. However, if no data elements classified in the classification folders exist, the folders may not be individually generated.

Fourth Embodiment

While in the foregoing embodiments, classification rules are defined for data forms of metadata elements, the present invention is not limited to those embodiments. For example, classification rules may be defined for each metadata element.

Fifth Embodiment

While in the foregoing embodiments, reorganization of classification item folders and classification folders is performed after a folder tree is generated, the present invention is not limited to this method. For example, each time a classification folder is generated, classification results may be checked to determine whether or not to generate the classification folder.

Other Embodiments

While embodiments of the present invention have been described in detail, the present invention may be applied to a system including a plurality of devices or to an apparatus including a single device.

The advantages of the present invention can also be achieved by executing the following processing. That is, a program implementing the functions of the foregoing embodiments is directly or remotely supplied to a system or an apparatus, and a computer included in the system or apparatus reads and executes the supplied program code.

Thus, program code installed in the computer to implement the functions and processes of the present invention on the computer also implements the present invention. In other words, a computer program implementing the functions and processes also constitutes an embodiment of the present invention.

In this case, any program type having functions of a program, such as an object code program, a program executed by an interpreter, or script data supplied to an OS, may be used.

Examples of a recording medium for supplying the program may include a flexible disk, a hard disk, an optical disk, a magneto-optical (MO) disk, a compact disk read-only memory (CD-ROM), a CD readable (CD-R) disk, and a CD rewritable (CD-RW) disk. Other examples of the recording medium include a magnetic tape, a non-volatile memory card, a ROM, and a digital versatile disk (DVD) (e.g., DVD-ROM and DVD-R).

The program may be downloaded from a homepage on the Internet using a browser of a client computer. A computer program of the present invention or a compressed file having an automatic install function may be downloaded from the homepage to a recording medium such as a hard disk. In another embodiment of the present invention, program code constituting the program of the present invention may be divided into a plurality of files and the files may be downloaded from different homepages. In other words, a World Wide Web (WWW) server which allows a plurality of users to download a program file implementing functions and processes of the present invention on a computer may also constitute an embodiment of the present invention.

Furthermore, the program of the present invention, which are encrypted and stored in storage media such as CD-ROM disks and the storage media may be distributed to users. In this case, only a user who meets predetermined conditions may be permitted to download key information for decryption from a homepage via the Internet to decode and execute the encrypted program using the key information and the program may be installed into a computer.

In an embodiment of the present invention, the computer may execute the read program to achieve the functions of the foregoing embodiments. In addition, an OS or the like operating on the computer may execute part of or the entirety of actual processing according to the instruction of the program to achieve the functions of the foregoing embodiments.

In further embodiments of the present invention, the functions of the foregoing embodiments may be achieved by the following processes. The program read from a recording medium may be written in a memory of a function extension board placed in the computer or a function extension unit connected to the computer. A CPU or the like of the function extension board or the function extension unit may execute part of or the entirety of actual processing according to the instruction of the program.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-155725 filed Jun. 12, 2007, which is hereby incorporated by reference herein in its entirety.

What is claimed is:

1. A data management apparatus for managing data elements using a plurality of metadata elements, the data management apparatus comprising:
    an organization unit configured to organize a folder system having a tree structure by repeating a classification operation in accordance with the number of metadata elements, the classification operation including
        classifying and storing the data elements into a plurality of folders in accordance with classification conditions on the basis of each of the plurality of metadata elements, and
        further classifying and storing data elements in each of the folders into a plurality of folders on the basis of a metadata element different from the metadata element associated with the folder;
    a reorganization unit configured to reorganize the organized folder system having a tree structure by deleting, when a classification result based on a given one of the metadata elements is present in a given folder of the folders in the organized folder system and is not present in other folders having a same parent folder as the given folder and arranged in the same layer as that of the given folder, the parent folder and sub-folders of the parent folder, wherein the sub-folders include the given folder and are arranged in one or more layers lower than a layer of the parent folder; and
    an assignment unit configured to assign a classification condition used for the given folder to an upper-layer folder arranged in a layer higher than the layer of the parent folder deleted by the reorganization unit.

2. The data management apparatus according to claim 1, further comprising:
- a classification rule storage unit configured to store a plurality of classification rules defining the classification conditions;
- a classification set storage unit configured to store classification sets each defining a plurality of sets, each set having a name of one of the metadata elements that is used for the classification operation performed by the organization unit and a piece of identification information for identifying a classification rule used with the metadata element among the plurality of classification rules; and
- an obtaining unit configured to obtain a classification set specified by a user from the classification set storage unit,
- wherein the organization unit sets at least one of the plurality of metadata elements that is used to perform the classification operation and one of the classification rules that is associated with each of the at least one of the metadata elements on the basis of the classification set obtained by the obtaining unit.

3. The data management apparatus according to claim 2, wherein the organization unit generates a structured-query-language query from the set classification rule, and performs the classification operation according to the structured-query-language query.

4. The data management apparatus according to claim 1, further comprising a display unit configured to display a classification browser view showing the folder system reorganized by the reorganization unit.

5. The data management apparatus according to claim 4, wherein the display unit displays the classification condition as information relating to the upper-layer folder.

6. The data management apparatus according to claim 4, wherein the classification browser view includes a folder display portion in which operation buttons corresponding to the folders are displayed, and a data list display portion in which a list of data elements stored in a folder corresponding to one of the operation buttons that is selected by a user is displayed.

7. A data management method in a data management apparatus for managing data elements using a plurality of metadata elements, the data management method comprising the steps of:
- organizing, by using an organization unit, a folder system having a tree structure by repeating a classification operation in accordance with the number of metadata elements, the classification operation including
  - classifying and storing the data elements into a plurality of folders in accordance with classification conditions on the basis of each of the plurality of metadata elements, and
  - further classifying and storing data elements in each of the folders into a plurality of folders on the basis of a metadata element different from the metadata element associated with the folder;
- reorganizing, by using a reorganization unit, the organized folder system having a tree structure by deleting, when a classification result based on a given one of the metadata elements is present in a given folder of the folders in the organized folder system and is not present in other folders having a same parent folder as the given folder and arranged in the same layer as that of the given folder, the parent folder and sub-folders of the parent folder, wherein the sub-folders include the given folder and are arranged in one or more layers lower than a layer of the parent folder; and
- assigning, by using an assignment unit, a classification condition used for the given folder to an upper-layer folder arranged in a layer higher than the layer of the parent folder deleted in the reorganizing step.

8. A computer-readable recording medium having recorded thereon a program causing a computer to execute the data management method according to claim 7.

* * * * *